July 24, 1962  M. KIILUNEN  3,046,387
WELDING DEVICE
Filed Nov. 13, 1959
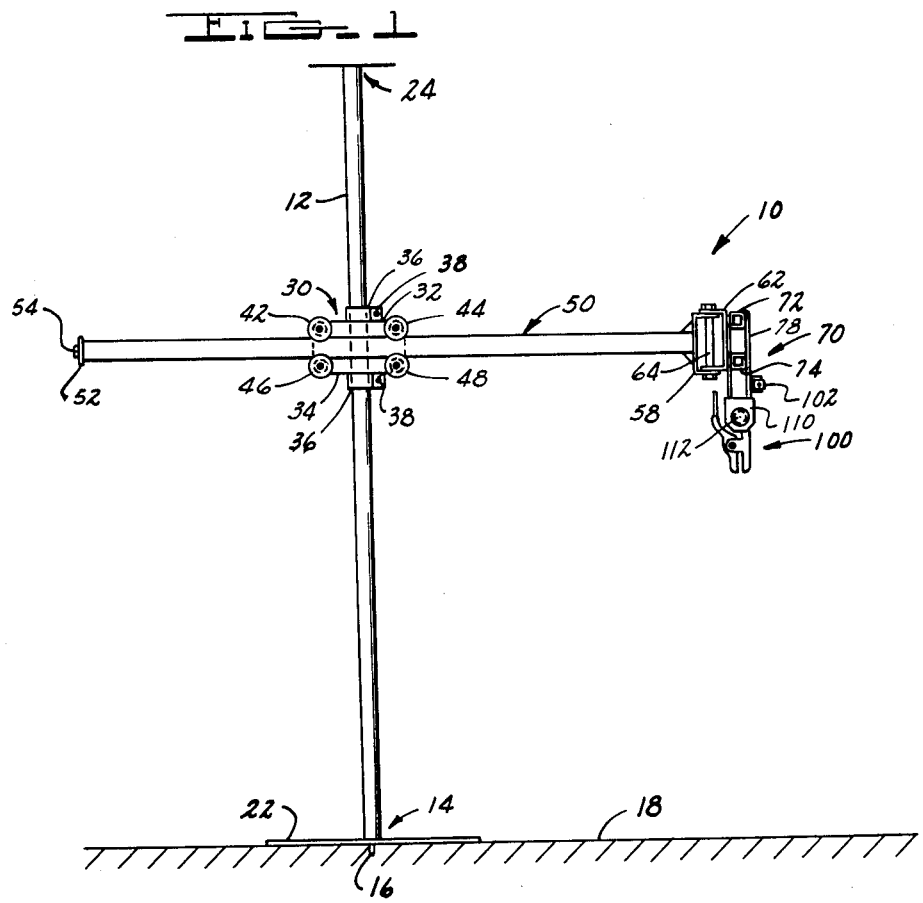
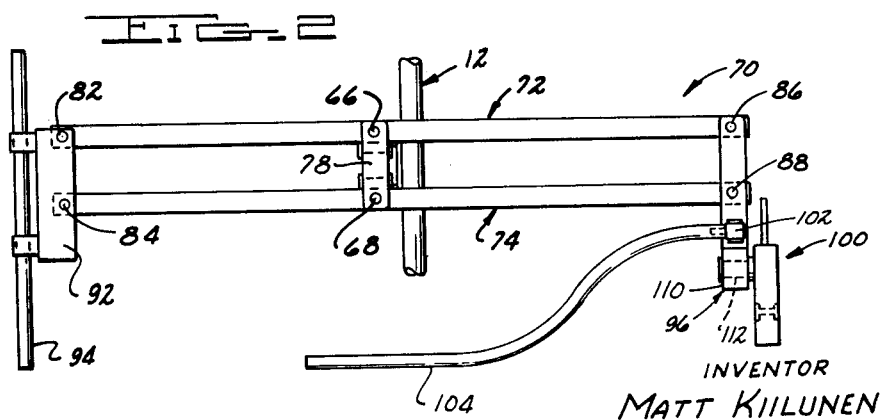
INVENTOR
MATT KIILUNEN
KOTTS & SHERIDAN
ATTORNEYS 3,046,387
WELDING DEVICE
Matt Kiilunen, 8331 Cahalan, Detroit, Mich.
Filed Nov. 13, 1959, Ser. No. 852,679
7 Claims. (Cl. 219—130)

The present invention relates to welding equipment and more particularly to a welding electrode holder adapted to be operated from a remote position.

In welding, particularly when welding heavy sections, the heat generated is intense and the arcing and sputtering of flying molten metal causes severe bodily burns to the welder.

It is therefore an object of the present invention to provide a welding electrode holder which can be operated efficiently from a distance.

Another object of the present invention is the provision of an adjustable welding electrode holder which is slidable in a horizontal plane while being pivotal in a vertical plane.

Another object of this invention is the provision of a welding electrode holder which is counterbalanced in the vertical plane.

Still another object of the invention is the provision of an electrode holder which can be used with conventional welding equipment.

Another object of the present invention is the provision of an electrode holder which is simple, durable and economically within the reach of job shop welders.

The foregoing and other objects can be accomplished by the provision of a welding electrode holder having a vertically disposed member secured to the floor and ceiling of a building; an adjustable bracket member frictionally secured to said vertically disposed member; a plurality of flanged rollers on said adjustable bracket; a generally horizontal bar slidably positioned between said rollers; stop means on one end of said bar to prevent accidental disassembly; a first bifurcated member on the other end of said horizontal rod; a second bifurcated member pivotally secured to said first bifurcated member; a pair of generally parallel bars affixed to said second bifurcated member; said parallel bars of approximately the same length; a pair of pivotal pins on each end of said parallel bars for maintaining said bars in relationship and providing a means for vertical movement of said bars; a counter weight secured to one end of said parallel bars; a welding electrode holder secured to the other end of said bars; said electrode holder pivotally mounted; and a handle for movement of said bars in a vertical direction.

Other objects of this invention will appear in the following description and appended claims, reference being had to the accompanying drawings forming a part of this specification wherein like reference characters designate corresponding parts in the several views.

In the drawings:

FIG. 1 is a front elevational view of the electrode holding device of the present invention.

FIG. 2 is an enlarged side elevational view of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings, FIG. 1 illustrates the assembled electrode holder 10 of the present invention with the operating handle removed. The complete electrode holder assembly 10 is mounted on a vertically disposed member 12. The bottom 14 of the vertical member 12 has a point 16 secured thereto for engagement with the floor 18. A flange member 22 is also secured thereto for additional support. The top portion 24 of the vertical member 12 is secured by any suitable means to the ceiling or other building support. The means may constitute a telescopic extension of the vertical member 12, a bracket means or welding, etc.

The top 24 of the vertical member 12 is secured for providing additional support. It may be found desirable to secure triangular gussets between the flange 22 and the bottom 14 of the vertical member 12 to obtain additional vertical support also.

Slidably affixed to the vertical member 12 is a roller bracket member 30. The top 32 and bottom 34 of the roller bracket 30 has affixed thereto, a friction means 36 for positioning the roller bracket 30 in any desired position. By tightening or loosening the screws 38 as the case may be, the roller bracket 30 is adjusted along the vertical member 12.

Two flanged rollers 42 and 44 are positioned in horizontal alignment on the upper portion of the roller bracket 30, while two similar flanged rollers 46 and 48 are positioned in alignment on the lower portion of the bracket.

A horizontally disposed rectangular rod 50 is positioned between the flanges of the rollers 42, 44, 46 and 48. The left end of rod 50 has removably secured thereto a stop flange 52 which is affixed after positioning. The stop flange 52 is also rectangular in shape and held in position by a screw 54. The right end 56 of rod 50 has secured thereto a vertically disposed bifurcated member 58. A second vertically disposed bifurcated member 62 is pivotally secured to the first bifurcated member with a vertically disposed pin member 64.

Two threaded members 66 and 68 extend through a mounting plate into the outside vertical face of the second bifurcated member 62 to position two generally rectangular pivotal bars 72 and 74 of the pivotal assembly 70. Although the two bars 72 and 74 are shown in FIG. 1, the threaded members 66 and 68 are best viewed in FIG. 2. The mounting plate 78 through which the threaded members 66 and 68 extend, forms the outside bearing and pivotal support means for the bars 72 and 74.

A second set of pivots 82 and 84 are secured to the left end of bars 72 and 74, while a third set of pivots 86 and 88 are affixed to the right end. Pivots 82 and 84 extend through a bracket 92 which has located thereon a counterweight 94. Another bracket means 96 on the right end of arms 72 and 74 position the pivotal electrode grip means 100. Below the right hand pivots 86 and 88 and on the outer face of bracket 96 is a pivotal block 102 which is adapted to receive a movable handle member 104. A second pivotal block 110 is located intermediate the sides and on the bottom of bracket 96. The electrode grip means 100 is positioned forward of the bracket 96 and pivotal about an axis 112 of the pivot block 110.

*Operation*

A welding electrode is positioned in the grip means 100 after the electric cables have been suitably secured. The workpiece to be welded is positioned on the floor, table or bench as the case may be. The electrode (not shown) is positioned over the workpiece by first rolling the horizontal rod 50 between rollers 42—48 to the right or left. Once the electrode is positioned over the workpiece the electrode is moved down by exerting an upward pressure or force on the counter weight 94 and a downward force on the handle member 104. As soon as an arc is struck, the operator proceeds to weld, moving the device as required to follow the contour of the part being welded.

To eliminate the possibility of bodily burns, a noninflammable material is positioned over the horizontal bar 50. This protects the welder from being struck by the flying molten metal.

Having thus described my invention, I claim:

1. In a welding device, the combination of a vertically disposed mounting member; means for securing the top and bottom of said vertically disposed member to the floor and ceiling; adjustable bracket means on said vertical member; a generally horizontal bar slidably affixed to said adjustable means; a first bifurcated member on one end of said horizontal rod; a second bifurcated member pivotally secured to said first bifurcated member; a pivotal member secured to said second bifurcated member; and an electrode holder secured to said pivotal member on one end thereof.

2. In a welding device, the combination of a vertically disposed mounting member; adjustable bracket means mounted on said vertically disposed member; a plurality of flanged rollers on said adjustable bracket; a generally horizontal bar slidably mounted between said flanged rollers; pivotal means on one end of said horizontal bar for positioning a pair of vertically movable bar members thereon; an electrode holder on one end of said vertically movable bars; and a counter weight on the other end of said movable bar members.

3. A device as in claim 2 wherein the horizontal bar is of generally rectangular configuration.

4. A device as in claim 2 wherein the movable bar members are of generally rectangular configuration.

5. A device as in claim 2 wherein the electrode holder is pivotal.

6. In a welding device, the combination of a vertically disposed member secured to the floor and ceiling of a building; an adjustable bracket member frictionally secured to said vertically disposed member; a plurality of flanged rollers on said adjustable bracket; a generally horizontal bar slidably positioned between said rollers; stop means on one end of said bar to prevent accidental disassembly; a first bifurcated member on the other end of said horizontal rod; a second bifurcated member pivotally secured to said first bifurcated member; a pair of generally parallel bars affixed to said second bifurcated member; said parallel bars of approximately the same length; a pair of pivotal pins on each end of said parallel bars for maintaining said bars in relationship and providing a means for vertical movement of said bars; a counter weight secured to one end of said parallel bars; a welding electrode holder secured to the other end of said bars; said electrode holder pivotally mounted; and a handle for movement of said bars in a vertical direction.

7. A device as in claim 6 wherein the handle member is pivotal about the electrode holder.

References Cited in the file of this patent

UNITED STATES PATENTS

| | | |
|---|---|---|
| 577,329 | Slawianoff | Feb. 16, 1897 |
| 1,550,651 | Charter | Aug. 18, 1925 |